INVENTORS
Stanley Dobren
& Eugene G. Lurcott, Jr.
BY J. L. Whittaker
ATTORNEY

United States Patent Office 2,959,750
Patented Nov. 8, 1960

2,959,750
SWEEP CIRCUIT

Eugene G. Lurcott, Jr., Woodbury, N.J., and Stanley Dobren, Philadelphia, Pa., assignors to Radio Corporation of America, a corporation of Delaware Filed Jan. 17, 1957, Ser. No. 634,795

9 Claims. (Cl. 332—42)

The present invention relates to a circuit for converting three carrier wave signals modulated by voltages in three-phase relation to two carrier wave signals amplitude modulated by phase displaced voltages. The invention is especially useful for producing amplitude modulated sweep voltages.

In a radial time base radar display, as, for example, a plan position indication (PPI) display, a sawtooth wave deflects the cathode ray beam radially outward from its center position in an angular direction which corresponds to the antenna beam direction. One method for obtaining this type of deflection is to employ magnetic beam deflection coils which are rotatable about the neck of the display tube in synchronism with the antenna rotation. The synchronism between the deflection coils and the radar antenna is ordinarily maintained by means of a servo system. In other systems, the deflection means, whether magnetic or electrostatic in nature, are held fixed and the sweep signal is modified to produce the radial, rotating trace. In these systems, the sawtooth wave may be applied to a two phase resolver, the rotor of which rotates with the radar antenna. The horizontal and vertical deflection outputs from the resolver are sawtooth signals whose envelopes are the electrical analog of the antenna motion. It is sometimes possible to attach the resolver directly to the antenna shaft. This makes the system relatively simple, as no servo system is required. However, when, as is the usual case, the indicator must be at a relatively large distance from the radar antenna, excessive signal attenuation and loss of bandwidth become serious problems. These losses must be compensated for and this requires expensive and relatively complicated equipments.

It is an object of the present invention to provide an improved and greatly simplified circuit for producing resolved sweep signals for a radial time base indicator which overcomes many of the problems outlined above.

A more general object of this invention is to provide an improved system for converting three carrier wave signals modulated by voltages in three-phase relation to two carrier wave signals modulated by voltages in any desired phase relationship—90° in one form of the invention.

The invention, in its broader aspects, includes a means, such as a synchro generator driven by the radar antenna, for producing three voltages which are modulated by voltages in three-phase relation. These voltages are applied to a mixing matrix such as an impedance network. In a specific form of the invention, the matrix consists of a three terminal, Y-shaped resistor network, the arms of which are of equal resistance. The carrier wave is also applied to the mixing matrix in such fashion that two output voltages are derived from the network, the modulating signals of which are displaced in phase from one another. The point on the matrix at which the carrier wave is injected determines the phase of the output modulating signals. For example, a point may be chosen to produce output modulating signals in phase quadrature relation. When used in a PPI radar display system, the two output voltages are detected and the respective envelopes employed to produce the cathode ray beam deflecting sweep signals.

The invention will be described in greater detail by reference to the following description taken in connection with the accompanying drawing in which.

Similar reference characters are applied to similar elements throughout the drawings.

Figure 1:
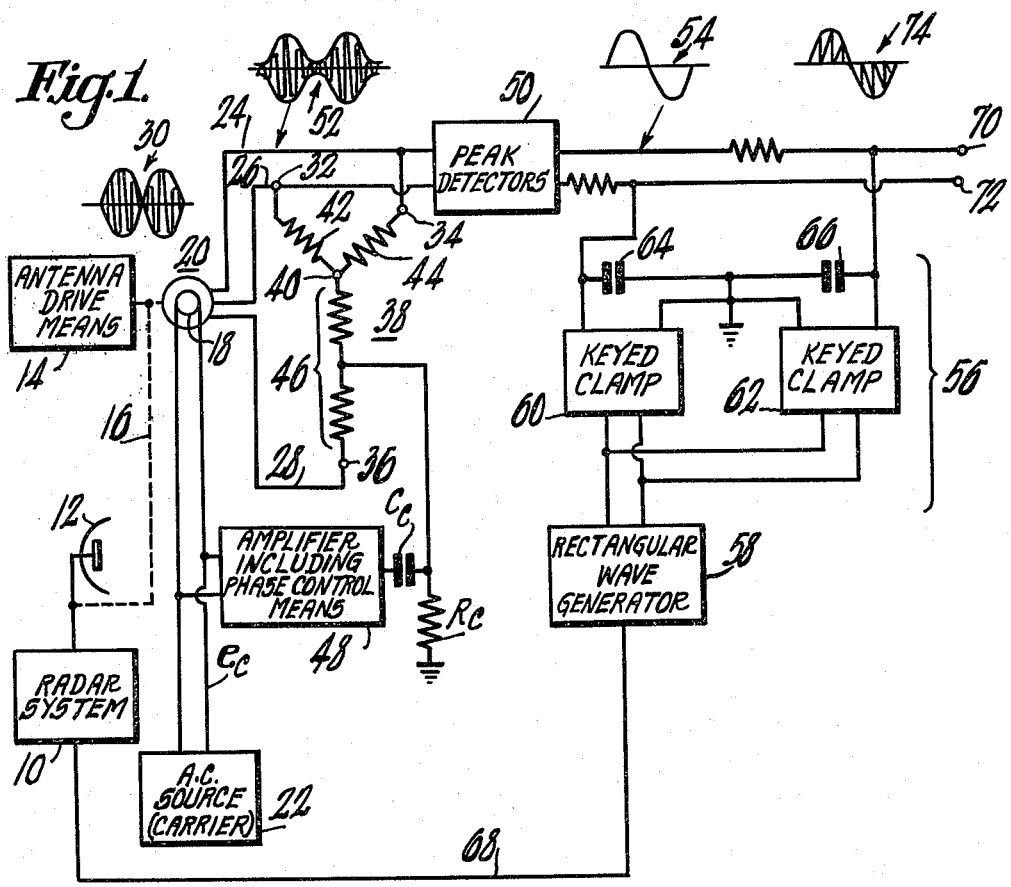
Figure 1 is a block and schematic and circuit diagram of a preferred form of this invention.

Referring to Figure 1, radar system 10 includes a rotatable directive antenna assembly 12 which is driven by the antenna drive means 14. The latter may be an electric motor or the like. The mechanical connection between the drive means and the antenna is indicated by dashed line 16. The drive means also drives the rotor 18 of the three-phase synchro generator 20. A carrier wave signal $e_c$ is applied to the rotor 18 from alternating current source 22. The frequency of source 22 may be the power line frequency, say 50, 60 or 400 cycles, for example.

The output signal of the synchro generator available at lines 24, 26 and 28 is in the usual form. Thus, each of the three signals is a suppressed carrier wave signal and each is modulated at the frequency at which the antenna drive means 14 drive the antenna. One of the three signals is shown at 30. The modulating voltages of the three signals are in three-phase relation.

The three output signals are applied to the three terminals 32, 34 and 36 of a Y impedance network 38, the center 40 of which floats with respect to ground. In a preferred form of the invention, the three arms of the Y comprise resistors 42, 44 and 46, respectively, of equal value. The network 38 is termed a mixing matrix in the discussion which follows. For reasons which will be given in more detail later, the carrier wave signal $e_c$, in addition to being applied to the synchro generator, is also applied, via amplifier 48, to the mixing matrix.

The operation of the above-described system can be more readily understood from the mathematical analysis which follows. The equations should be considered in connection with Figure 2, which is a portion of Figure 1 to which various identifying reference letters have been applied. In the analysis, it is assumed that the input impedance to the detectors 50 (Figure 1) following the mixing matrix is high, compared to the impedance of the matrix. This is actually the case, and it permits one to neglect the loading effect on the matrix.

Figure 2:
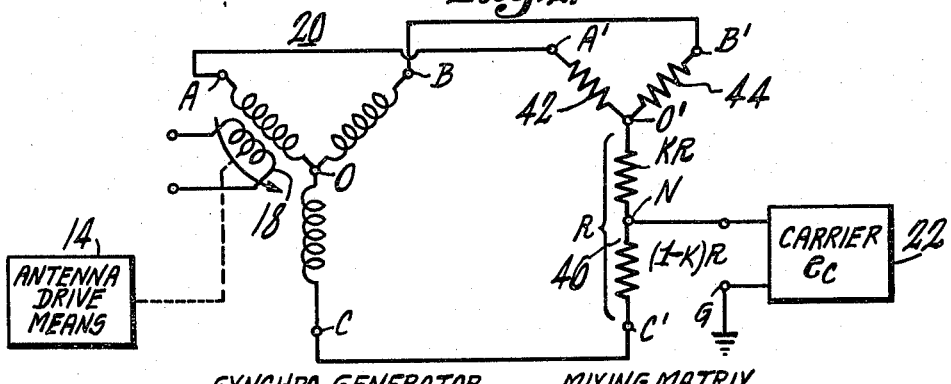
Figure 2 is a block and circuit diagram which is useful in explaining how the system of the invention operates.

Synchro generator 20 may be either Y or delta connected. In the analysis, the generator is considered Y connected, as shown in Figure 2. However, the conclusions reached are equally applicable to the delta connected generator as both networks are equivalent.

The voltages across windings OA, OB and OC of the synchro generator are $$e_{OA} = A \cos(\omega_s t + 5/6\pi) \cos \omega_c t \quad (1)$$
$$e_{OB} = A \cos(\omega_s t + \pi/6) \cos \omega_c t \quad (2)$$
$$e_{OC} = A \cos(\omega_s t - \pi/2) \cos \omega_c t \quad (3)$$

where:

$A$ = the maximum amplitude
$\omega_s$ = the angular modulating frequency
$\omega_c$ = the angular carrier frequency Resistors 42, 44 and 46 are of equal value. In other words, the load connected to the generator is balanced.

Therefore the voltages $e_{O'A'}$, $e_{O'B'}$, $e_{O'C'}$ across the resistors are in the same form as 1, 2 and 3 above. Therefore:

$$e_{O'A'} = e_{OA} \quad (4)$$
$$e_{O'B'} = e_{OB} \quad (5)$$
$$e_{O'C'} = e_{OC} \quad (6)$$

The voltages appearing at A' and B' measured relative to node N, are:

$$e_{NA'} = e_{NO'} + e_{O'A'} \quad (7)$$

$$e_{NB'} = e_{NO'} + e_{O'B'} \quad (8)$$

but $$e_{NO'} = K e_{C'O'} \quad (9)$$

where K is the fraction of the total R tapped from O' to form node N. Substituting Equation 9 in Equations 7 and 8 gives:

$$e_{NA'} = e_{O'A'} + K e_{C'O'}$$
$$e_{NB'} = e_{O'B'} + K e_{C'O'}$$

and since $$e_{O'C'} = -e_{C'O'}$$

we have, $$e_{NA'} = e_{O'A'} - K e_{O'C'} \quad (10)$$
$$e_{NB'} = e_{O'B'} - K e_{O'C'} \quad (11)$$

Substituting Equations 4, 5 and 6 in Equations 10 and 11 gives:

$$e_{NA'} = A \cos(\omega_s t + 5/6\pi) \cos \omega_c t - KA \cos(\omega_s t - 1/2\pi) \cos \omega_c t$$
$$e_{NB'} = A \cos(\omega_s t + 1/6\pi) \cos \omega_c t - KA \cos(\omega_s t - 1/2\pi) \cos \omega_c t$$

which may be simplified to:

$$e_{NA'} = A\{\cos(\omega_s t + 5/6\pi) - K \cos(\omega_s t - 1/2\pi)\} \cos \omega_c t \quad (12)$$
$$e_{NB'} = A\{\cos(\omega_s t + 1/6\pi) - K \cos(\omega_s t - 1/2\pi)\} \cos \omega_c t \quad (13)$$

Applying the formula for the cosine of the sum of two angles gives:

$$e_{NA'} = A\left\{-\frac{\sqrt{3}}{2} \cos \omega_s t - 1/2 \sin \omega_s t - K \sin \omega_s t\right\} \cos \omega_c t$$

$$e_{NB'} = A\left\{\frac{\sqrt{3}}{2} \cos \omega_s t - 1/2 \sin \omega_s t - K \sin \omega_s t\right\} \cos \omega_c t$$

collecting terms:

$$e_{NA'} = A\left[-\frac{\sqrt{3}}{2} \cos \omega_s t - (K+1/2) \sin \omega_s t\right] \cos \omega_c t \quad (14)$$

$$e_{NB'} = A\left[\frac{\sqrt{3}}{2} \cos \omega_s t - (K+1/2) \sin \omega_s t\right] \cos \omega_c t \quad (15)$$

The value of K can be determined as follows. Multiply Equations 14 and 15 by $$\left[\frac{\sqrt{\left(\frac{\sqrt{3}}{2}\right)^2 + (K+1/2)^2}}{\sqrt{\left(\frac{\sqrt{3}}{2}\right)^2 + (K+1/2)^2}}\right] = 1$$

this gives:

$$e_{NA'} = A\sqrt{\left(\frac{\sqrt{3}}{2}\right)^2 + (K+1/2)^2}\left[-\frac{\frac{\sqrt{3}}{2}}{\sqrt{\left(\frac{\sqrt{3}}{2}\right)^2 + (K+1/2)^2}} \cos \omega_s t - \frac{(K+1/2)}{\sqrt{\left(\frac{\sqrt{3}}{2}\right)^2 + (K+1/2)^2}} \sin \omega_s t\right] \cos \omega_c t$$

$$e_{NB'} = A\sqrt{\left(\frac{\sqrt{3}}{2}\right)^2 + (K+1/2)^2}\left[\frac{\frac{\sqrt{3}}{2}}{\sqrt{\left(\frac{\sqrt{3}}{2}\right)^2 + (K+1/2)^2}} \cos \omega_s t - \frac{(K+1/2)}{\sqrt{\left(\frac{\sqrt{3}}{2}\right)^2 + (K+1/2)^2}} \sin \omega_s t\right] \cos \omega_c t$$

from which we see:

$$e_{NA'} = A\sqrt{\left(\frac{\sqrt{3}}{2}\right)^2 + (K+1/2)^2}[-\cos \theta \cos \omega_s t - \sin \theta \sin \omega_s t] \cos \omega_c t \quad (16)$$

$$e_{NB'} = A\sqrt{\left(\frac{\sqrt{3}}{2}\right)^2 + (K+1/2)^2}[\cos \theta \cos \omega_s t - \sin \theta \sin \omega_s t] \cos \omega_c t \quad (17)$$

where $$\theta = \cos^{-1} \frac{\frac{\sqrt{3}}{2}}{\sqrt{\left(\frac{\sqrt{3}}{2}\right)^2 + (K+1/2)^2}} \quad (18)$$

$$\theta = \sin^{-1} \frac{(K+1/2)}{\sqrt{\left(\frac{\sqrt{3}}{2}\right)^2 + (K+1/2)^2}} \quad (18a)$$

Using a trigonometric identity for the terms in brackets of Equations 16 and 17 gives:

$$e_{NA'} = A\sqrt{\left(\frac{\sqrt{3}}{2}\right)^2 + (K+1/2)^2}[\cos(\omega_s t - \theta + \pi)] \cos \omega_c t \quad (19)$$

$$e_{NB'} = A\sqrt{\left(\frac{\sqrt{3}}{2}\right)^2 + (K+1/2)^2}[\cos(\omega_s t + \theta)] \cos \omega_c t \quad (20)$$

For a quadrature relationship between the two modulating signals, it is apparent that $$(-\theta + \pi) - (\theta) = \pi/2 \text{ or } \theta = \pi/4 \quad (21)$$

Substituting (21) in (18), gives:

$$\cos \pi/4 = \frac{\sqrt{3}}{2\sqrt{\left(\frac{\sqrt{3}}{2}\right)^2 + (K+1/2)^2}}$$

$$K = \frac{-1 \pm \sqrt{1+2}}{2}$$

since K must be positive, $$K = \frac{\sqrt{3}-1}{2} \approx 0.367 \quad (22)$$

Placing (21) and (22) in (19) and (20) gives the final form of the voltages:

$$e_{NA'} = \sqrt{\frac{3}{2}} A [\cos(\omega_s t + 3/4\pi)] \cos \omega_o t \quad (23)$$

$$e_{NB'} = \sqrt{\frac{3}{2}} A [\cos(\omega_s t + 1/4\pi)] \cos \omega_o t \quad (24)$$

and the envelopes are in quadrature. The voltages at A' and B' relative to ground are:

$$e_{GA'} = e_{GN} + e_{NA'} \quad (25)$$
$$e_{GB'} = e_{GN} + e_{NB'} \quad (26)$$

where $$e_{GN} = B \cos \omega_c t \quad (27)$$

and represents the reinserted carrier signal.

Placing (23), (24) and (27) in Expressions 25 and 26 gives:

$$e_{GA'} = B \cos(\omega_o t) + \sqrt{\frac{3}{2}} A [\cos(\omega_s t + 3/4\pi)] \cos \omega_o t \quad (28)$$

$$e_{GB'} = B \cos(\omega_o t) + \sqrt{\frac{3}{2}} A [\cos(\omega_s t + 1/4\pi)] \cos \omega_o t \quad (29)$$

collecting terms results in:

$$e_{GA'} = B \left[ \sqrt{\frac{3}{2}} \cdot \frac{A}{B} \cos(\omega_s t + 3/4\pi) + 1 \right] \cos \omega_o t \quad (30)$$

$$e_{GB'} = B \left[ \sqrt{\frac{3}{2}} \cdot \frac{A}{B} \cos(\omega_s t + 1/4\pi) + 1 \right] \cos \omega_o t \quad (31)$$

which are recognizable as the standard equations for amplitude modulation. The term $$\left( \sqrt{\frac{3}{2}} \cdot \frac{A}{B} \right)$$

is the degree of amplitude modulation and should be less than unity.

If we apply the formula for the product of cosines to Expressions 28 and 29, we obtain:

$$e_{GA'} = B \cos \omega_o t + \sqrt{\frac{3}{8}} A \{ [\cos(\omega_o + \omega_s)t + 3/4\pi] + [\cos(\omega_o - \omega_s)t - 3/4\pi] \} \quad (32)$$

$$e_{GB'} = B \cos \omega_o t + \sqrt{\frac{3}{8}} A \{ [\cos(\omega_o + \omega_s)t + 1/4\pi] + [\cos(\omega_o - \omega_s)t - 1/4\pi] \} \quad (33)$$

The above are equations for amplitude modulated signals with the modulating voltages in quadrature. Note the presence of the upper and lower sidebands.

The above equations demonstrate that when $$K = \frac{\sqrt{3}-1}{2}$$

the modulating voltages are in quadrature. However, the invention is perfectly general and is applicable to the adjustment of the phase relation between the modulating voltages to any desired value. This phase relation is a function of the value K.

From Equations 19 and 20 above, it is seen that the angle $\phi$ between the two modulating voltages is $$\phi = \pi - 2\theta \quad (34)$$

where $\theta$ was defined in Equation 18 as $$\theta = \cos^{-1} \frac{\sqrt{3}}{2\sqrt{\left(\frac{\sqrt{3}}{2}\right)^2 + (K+1/2)^2}}$$

simplifying, we have:

$$\theta = \cos^{-1} \frac{\sqrt{3}}{2\sqrt{K^2 + K + 1}}$$

Therefore, the angle $\phi$ between the two modulating voltages is $$\phi = \pi - 2 \cos^{-1} \frac{\sqrt{3}}{2\sqrt{K^2 + K + 1}} \quad (35)$$

The derivation above can readily be checked by substituting the value of $$\frac{\sqrt{3}-1}{2}$$

for K in Equation 35. Solving for $\phi$ we obtain $$\frac{\pi}{2}$$

or 90°. When $K=0$, $\phi$ turns out to be 120°, as one would expect, and when $K=1$, $\phi=30°$. Other values of K give other values of $\phi$.

In the circuit of Figure 1, K is adjusted to have a value $$\frac{\sqrt{3}-1}{2}$$

The modulating voltages of the carrier wave applied to peak detectors 50 are therefore in quadrature. The peak detectors detect the modulation envelopes and provide two modulation components in quadrature, one of which is shown at 54.

The sawtooth wave to be modulated is generated in a conventional sweep circuit 56. It includes a rectangular wave generator 58, the output of which is applied through keyed clamps 60 and 62 to charging capacitors 64 and 66. These charging capacitors charge toward the instantaneous value of each detector output. The widths of the rectangular pulses generated by rectangular wave generator 58 correspond to the radar range interval of interest. The generator output is synchronous with the radar pulse repetition rate, the synchronizing pulses being applied via lead 68. The resultant sinusoidally modulated sawtooth signals available at terminals 70 and 72 are in quadrature, one of the signals being shown at 74. Terminal 70 may be coupled to the horizontal deflection means of a cathode ray indicator and terminal 72 to the vertical deflection means of the indicator.

The phase control of amplifier 48, shown in Figure 1, is necessary to compensate for any phase shift which may occur in the synchro generator. The phase control setting should be such that the phase of the carrier inserted at the matrix is the same as the phase of the suppressed carrier signals across N'A' (Figure 2) and N'B' (Figure 2). If the phases are not identical, the output voltages from the matrix are distorted. The accuracy with which the phase of the inserted carrier must be fixed relative to the suppressed carrier is determined by the amount of envelope distortion that can be tolerated in a particular application.

The amplitude of the injected carrier should be equal to or greater than the amplitude of the suppressed carrier signals across N'A' and N'B' for optimum performance. The greater the amplitude of the inserted carrier relative to the suppressed carrier, the less the distortion of the output of the matrix. This can readily be demonstrated mathematically, however, the analysis is rather lengthy and involved and will not be given here.

Capacitor $C_c$ and resistor $R_c$ comprise a coupling network. The resistance of $R_c$ should be sufficiently large to prevent loading of the amplifier 48 and capacitor $C_c$ should be large enough to couple the carrier signal to $R_c$ without attenuation.

Figure 3:
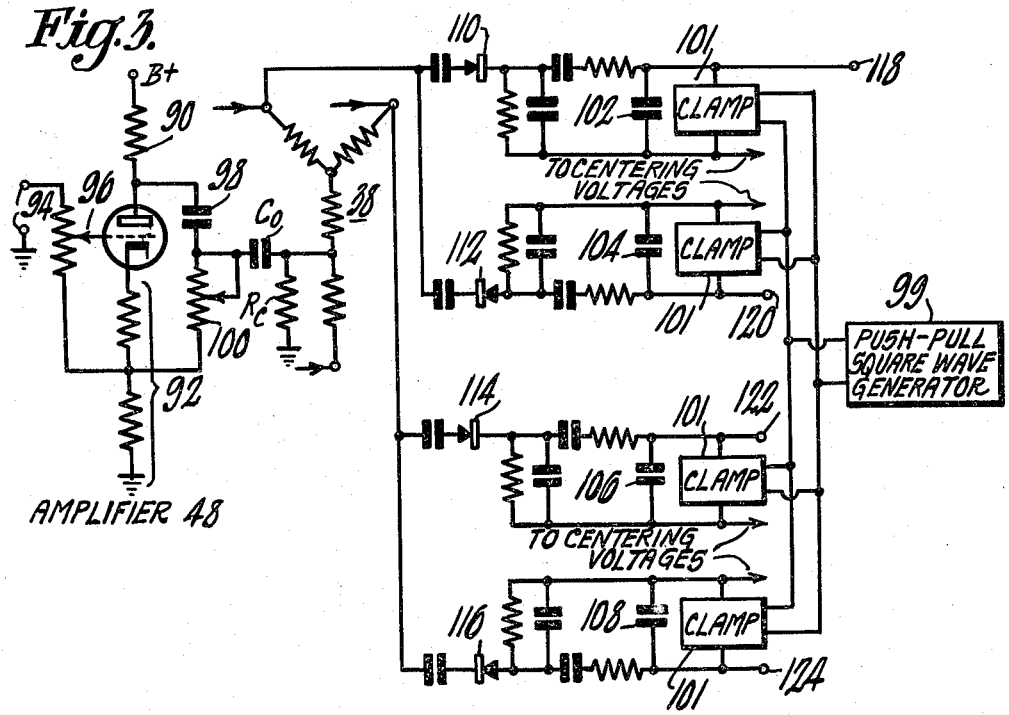
Figure 3 is a schematic circuit diagram of a portion of a modified form of the invention shown in Figure 1.

Further details of some of the circuits which may be used in the arrangement such as shown in Figure 1, are given in Figure 3. Amplifier 48 has an anode load circuit 90 and a cathode load circuit 92. The carrier wave is applied to the grid-to-cathode circuit of the amplifier at terminals 94. The amplitude of the output wave may readily be adjusted by adjusting potentiometer 96. The phase shift producing network including capacitor 98 and resistor 100 is located in the amplifier output circuit. The phase of the carrier wave is adjustable by means of a tap on resistor 100. The square wave generator 99 operates in push-pull rather than being single ended as shown in the embodiment of Figure 1. The clamps 101, rather than being returned to ground, as shown in Figure 1, are connected to receive the cathode ray tube centering voltages.

In operation, during the sweep time the clamps are cut off and capacitors 102, 104, 106 and 108 charge toward the instantaneous peak voltages at the outputs of detectors 110, 112, 114 and 116, respectively. However, before they charge to more than a small fraction of the charge they are capable of assuming, the keyed clampers are turned on and they clamp the capacitors to the centering voltages, discharging them for the retrace or flyback period. The capacitors are charged to only a fraction of their peak value in order to maintain their sawtooth output waves linear.

The output voltages at terminals 118 and 120 are applied to the horizontal deflection plates, and the output voltages at terminals 122 and 124 are applied to the vertical deflection plates.

The system above has been described in terms of converting three amplitude modulated suppressed carrier signals to two amplitude modulated signals, the modulation components of which have a predetermined phase relationship. The invention is equally applicable to conventional amplitude modulated signals. If, in the arrangement of Figure 4, conventional amplitude modulated signals are applied to terminals 126, 128 and 130 of the impedance matrix, and point N in the matrix is connected to A.C. ground, the output signals to ground available at terminals 126 and 128 will be amplitude modulated signals, the modulation components of which have a predetermined phase relationship. In this case, it is not necessary to reinsert the carrier. When K is equal to $$\frac{\sqrt{3}-1}{2}$$

the modulation components of the output waves at terminals 126 and 128 are in quadrature.

Figure 4:
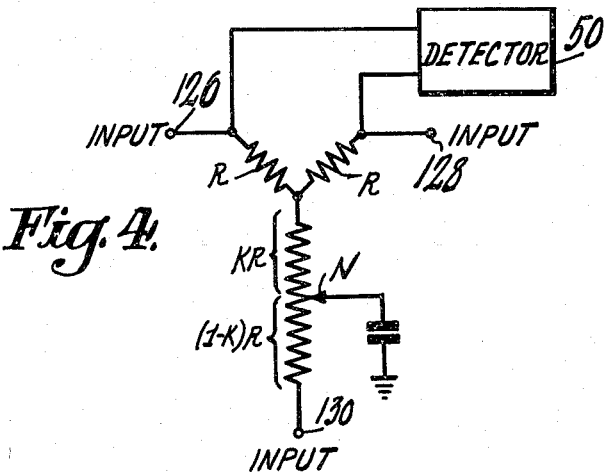
Figure 4 is a schematic circuit diagram to illustrate a general aspect of the present invention.

The system shown in Figure 4 is also applicable to the case in which the three input signals are amplitude modulated, suppressed carrier signals. However, if the carrier is not injected at N, the outputs from the matrix are still suppressed carrier signals. It is therefore necessary to use special types of detectors at block 50 in order to recover the modulation information.

What is claimed is:

1. In combination, means producing three amplitude modulated signals whose modulation voltages are in three-phase relation; and means including a four terminal impedance network to three terminals of which the three signals are applied and to the fourth terminal of which the carrier component of the signal is applied for converting the three signals to two amplitude modulated signals whose modulating voltages are in quadrature.

2. In combination, means producing three amplitude modulated suppressed carrier frequency signals whose modulating voltages are in three-phase relation; an impedance network connected to receive said three signals; and means for supplying a signal at the carrier frequency to said impedance network so as to convert said three signals to two amplitude modulated signals whose modulating voltages are displaced in phase from one another.

3. In combination, a circuit for producing three amplitude modulated suppressed carrier wave signals whose modulating voltages are in three-phase relation; a three terminal impedance network to the three terminals of which the respective modulated carrier wave signals are applied; circuit means coupled to a point on said network between two of the terminals thereof for supplying a wave at the carrier frequency to said network; and circuit means coupled to said network for deriving therefrom two amplitude modulated signals whose modulating voltages are displaced in phase from one another.

4. In combination, means producing three amplitude modulated suppressed carrier wave signals whose modulating voltages are in three-phase relation; a Y resistor network the three ends of the Y comprising input terminals, and the center of the Y comprising a common connection; means for applying the three amplitude modulated signals to the three terminals, respectively; a tap on one of said resistors; and means for introducing the carrier wave signal at said tap.

5. In combination, means for producing three amplitude modulated suppressed carrier signals which can be represented by the expressions $$E_x = A \cos (\omega_s t + \theta_0 + 2/3\pi) \cos \omega_c t$$
$$E_y = A \cos (\omega_s t + \theta_0) \cos \omega_c t$$
$$E_z = A \cos (\omega_s t + \theta_0 - 2/3\pi) \cos \omega_c t$$

where A equals a constant, $\omega_s$ equals the angular frequency of the modulating signal, $t$ equals time, $\omega_c$ equals the angular frequency of the carrier wave, and $\theta_0$ is any arbitrary phase; means for combining with said three voltages a fourth voltage $E_q$, where $E_q$ equals $F \cos \omega_c t$, and F is at least equal to $$\sqrt{\frac{3}{2}}$$

and means for deriving from the combined voltages two output voltages $E_R$ and $E_S$, where $E_R$ equals $G \cos (\omega_s t + \phi)$ and $E_S$ equals $G \cos (\omega_s t + \phi + \pi/2)$, where G is a constant and $\phi$ is another arbitrary phase.

6. In combination, means for producing three amplitude modulated suppressed carrier signals which can be represented by the expressions $$E_x = A \cos (\omega_s t + \theta_0 + 2/3\pi) \cos \omega_c t$$
$$E_y = A \cos (\omega_s t + \theta_0) \cos \omega_c t$$
$$E_z = A \cos (\omega_s t + \theta_0 - 2/3\pi) \cos \omega_c t$$

where A equals a constant, $\omega_s$ equals the angular frequency of the modulating signal, $t$ equals time, $\omega_c$ equals the angular frequency of the carrier wave, and $\theta_0$ is any arbitrary phase; means for combining with said three voltages a fourth voltage $E_q$, where $E_q$ equals $F \cos \omega_c t$, and F is at least equal to $$\sqrt{\frac{3}{2}}A$$

means for deriving from the combined voltages two output voltages $E_R$ and $E_S$, where $E_R$ equals $G \cos (\omega_s t + \phi)$ and $E_S$ equals $G \cos (\omega_s t + \phi + \psi)$, where G is a constant, $\phi$ is another arbitrary phase position, and $\psi$ is an angle.

7. A sweep generator comprising, in combination, means producing three amplitude modulated suppressed carrier frequency signals whose modulating voltages are in three phase relation; an impedance network connected to receive said three signals; means for supplying a signal at the carrier frequency to said impedance network so as to convert said three signals to two amplitude modulated signals whose modulating voltages are in quadrature; detector means connected to receive said two amplitude modulated signals for detecting the modulation envelopes of said signals; a sawtooth wave generator; and modulating means in circuit with said generator and said detector for producing two amplitude modulated sawtooth wave signals, the modulation components of which comprise sine waves in phase quadrature relation.

8. In combination, means producing three amplitude modulated suppressed carrier wave signals whose modulated voltages are in three-phase relation; a Y resistor network having resistive arms of equal value, the three ends of the Y comprising input terminals, and the center of the Y comprising a common connection; means for applying the three amplitude modulated signals to the three terminals, respectively; a tap on one of said resistors at a point along its length such that the resistance between said tap and the center of said Y is $$\frac{\sqrt{3}-1}{2}$$

of the total value of said resistor; and means for introducing the carrier wave signal at said tap.

9. A sweep generator comprising, in combination, a three terminal Y impedance network having a common center connection which floats with respect to ground; means for producing three amplitude modulated suppressed carrier signals whose modulating voltages are in three-phase relation and for applying the respective signals to said three terminals; means injecting the carrier wave signal to a point on said network such that output signals available at two of said terminals are amplitude modulated by modulating voltages which are in quadrature; a sawtooth wave generator; and means receptive of said two amplitude modulated signals and in circuit with said sawtooth wave generator for producing amplitude modulated sawtooth wave signals, the modulating voltages of which are in quadrature.

References Cited in the file of this patent

UNITED STATES PATENTS

| | | |
|---|---|---|
| 2,604,609 | Wilson | July 22, 1952 |
| 2,727,224 | Adkins et al. | Dec. 13, 1955 |

OTHER REFERENCES

Cathode Ray Tube Displays by Soller, Starr and Valley, McGraw-Hill 1948.

UNITED STATES PATENT OFFICE

CERTIFICATION OF CORRECTION

Patent No. 2,959,750                                        November 8, 1960

Eugene G. Lurcott, Jr., et al.

It is hereby certified that error appears in the above numbered patent requiring correction and that the said Letters Patent should read as corrected below.

Column 8, between lines 41 to 44, for " $\sqrt{\frac{3}{2}}$ " read -- $\sqrt{\frac{3}{2}} A$; --.

Signed and sealed this 25th day of April 1961.

(SEAL)

Attest:
ERNEST W. SWIDER
Attesting Officer

DAVID L. LADD
Commissioner of Patents